(12) United States Patent
Bruns

(10) Patent No.: US 6,487,359 B2
(45) Date of Patent: Nov. 26, 2002

(54) SYSTEM AND METHOD FOR THE VACUUM ASSISTED INSERTION OF OPTICAL FIBERS

(76) Inventor: Donald Bruns, 7387 Celata La., San Diego, CA (US) 92129

( * ) Notice: Subject to any disclaimer, the term of this patent is extended or adjusted under 35 U.S.C. 154(b) by 0 days.

(21) Appl. No.: 09/834,734

(22) Filed: Apr. 13, 2001

(65) Prior Publication Data

US 2002/0122654 A1 Sep. 5, 2002

Related U.S. Application Data

(60) Provisional application No. 60/273,437, filed on Mar. 5, 2001.

(51) Int. Cl.$^7$ .................................................. G02B 6/00
(52) U.S. Cl. .............................. 385/147; 385/95; 385/54
(58) Field of Search ............................ 385/147, 95–99, 385/54, 59

(56) References Cited

U.S. PATENT DOCUMENTS 5,796,896 A * 8/1998 Lee .............................. 385/59
6,034,718 A * 3/2000 Hattori ..................... 385/95 X

* cited by examiner

Primary Examiner—Phan T. H. Palmer
(74) Attorney, Agent, or Firm—Gary L. Eastman

(57) ABSTRACT

A system and method for the vacuum assisted insertion of optical fibers includes a plate with one or more fiber alignment holes and a vacuum-sealed region on the exit end of the alignment holes. A vacuum source is connected to the vacuum-sealed region and creates a partial vacuum which draws air through the alignment holes creating an airstream into the alignment hole. As a fiber is moved toward the alignment hole, the airstream converging on the hole creates a centering force which acts to pull the fiber into alignment with the hole and the fiber passes directly into the hole. The use of a vacuum produces a precise alignment of a fiber or fibers that can be automated and is significantly quicker and more efficient than any other existing apparatus.

17 Claims, 2 Drawing Sheets

SYSTEM AND METHOD FOR THE VACUUM ASSISTED INSERTION OF OPTICAL FIBERS

RELATED APPLICATION

This application is a continuation in part of Provisional Patent Application Ser. No: 60/273,437 entitled "Vacuum Assisted Insertion of Optical Fibers" filed Mar. 5, 2001.

FIELD OF THE INVENTION

The present invention relates generally to optical fibers. More specifically, the present invention pertains to methods of positioning and aligning optical fibers within a fiber optic system. The present invention is particularly, though not exclusively, useful for quickly and accurately inserting optical fibers into fiber ferrules and other fiber alignment devices.

BACKGROUND OF THE INVENTION

Over the past several decades, the use of optical fibers, or fiber optics, to transmit information on a light beam have become increasingly popular. In fact, much of the information which is transmitted today within the telecommunications industry is done over optical fibers.

A typical single mode (SM) optical fiber has a diameter of approximately 125 microns (125 $\mu$m) and is formed with a glass core with a diameter of about ten microns (10 $\mu$m). As a result, these optical fibers are rather flexible, yet must be positioned to a very high degree of precision.

As a result of the widespread use of optical fibers, and the fact that the typical optical fibers are very small and flexible, the handling, positioning and termination of these fibers represents a significant challenge to manufacturers of high quality fiber-optic products. Moreover, because some optical equipment incorporates assemblies having many optical fibers that must all be positioned to within a few microns, or inserted into fiber receptacles, or ferrules, this challenge often represents a significant manufacturing problem. The positioning of optical fibers is even more difficult when attempting to position the fibers in blind holes, or when attempting to automate the manufacturing process.

SUMMARY OF THE PRESENT INVENTION

The use of a vacuum to facilitate the insertion of optical fibers greatly simplifies the automated assembly process. In fact, the mechanical alignment tolerances typically experienced in fiber optic manufacturing may be reduced to hundreds of microns, so insertion of fibers into blind holes, typically a most challenging assembly using current approaches, may be easily automated. If conventional ferrules are used, a nozzle end or indent is typically used to guide the fiber. This invention eliminates the need for these nozzles or indented portions, and is even applicable to flat entrance holes.

In a typical application, an optical fiber is positioned for insertion into a hole within about 0.2 mm to 0.3 mm, and held about 50 mm from the end of the fiber. As the fiber is advanced toward the hole, the airstream converging into the hole acts to pull the fiber into alignment with the hole. Consequently, the fiber can be brought near the hole very rapidly, and because the fiber is flexible, the fiber will always go directly into the hole. Experiments have been conducted under microscope observation, and the principle has been repeatedly tested and the sequence observed in each assembly process.

In an application where a partial vacuum may be applied to an alignment plate having a number of alignment holes, a fiber clamp having multiple optical fibers may be positioned such that all of the optical fibers in the clamp may be inserted into the alignment plate simultaneously. As a result, large scale assembly of such delicate and flexible optical fibers, while maintaining a very high level of precision, may be achieved and represents a significant advantage over the current state of the art.

DESCRIPTION OF THE DRAWINGS

The novel features of this invention, as well as the invention itself, both as to its structure, its operation, and its method of use, will be best understood from the accompanying drawings, taken in conjunction with the accompanying description, in which like reference characters refer to similar parts, and in which.

DETAILED DESCRIPTION

Figure 1:
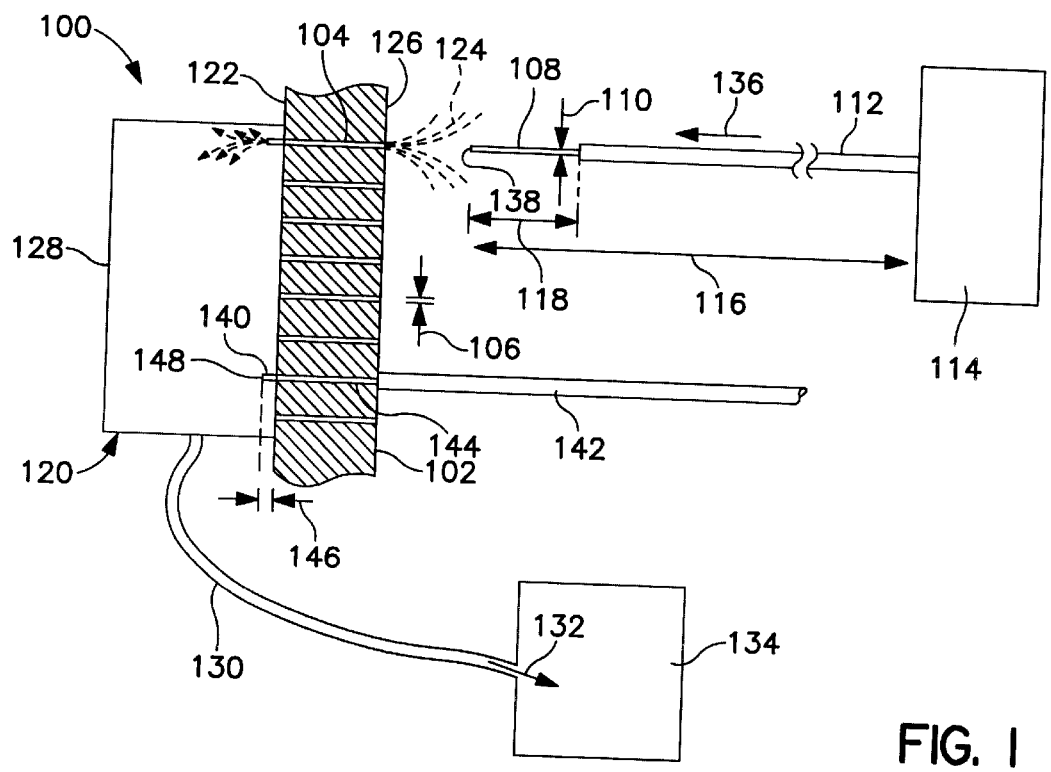
FIG. 1 is a cross-sectional view of a preferred embodiment of the present invention showing the vacuum region at the exit end of a plate formed with a number of fiber alignment holes.

Referring initially to FIG. 1, a cross-sectional view of the preferred embodiment of the System for the Vacuum Assisted Insertion Of Optical Fibers of the present invention is shown and generally designated 100. System 100 includes a plate 102 formed with a number of alignment holes 104 each having a diameter 106 for receiving an optical fiber 108 having a diameter 110.

Each fiber 108 may be manufactured with a protective buffer sleeve 112 and extends from a fiber clamp 114. The fiber 108 and buffer sleeve 112 extend from fiber clamp 114 a distance 116, with a length 118 of buffer sleeve 112 being stripped so a portion of fiber 108 is exposed for insertion into the plate 102. Fiber clamp 114 provides for the secure attachment of the fiber 108 into position and minimizes the movement of the fiber 108 during the assembly process and may be left in place to secure the fiber 108 within a final fiber optic product. Alternatively, fiber clamp 114 may be removed after assembly or once fiber 108 is secured in place with epoxy or RTV.

The diameter 106 of alignment hole 104 is typically 127 microns (127 $\mu$m) and just slightly larger than the diameter 110 of an optical fiber 108 as the diameter 110 of a typical optical fiber is approximately 125 microns (125 $\mu$m). As a result of this very small diameter 110, and the need to precisely place the flexible fiber 108 within the alignment hole 104 of similar diameter 106, insertion without using the present invention is particularly challenging, and often results in damage to the fiber 108.

The length 118 of optical fiber 108 which extends from buffer sleeve 112 is typically 50 mm. Due to the flexible nature of optical fiber 108, this 50 mm length of fiber is sufficient to allow insertion of the fiber 108 into alignment hole 104 in accordance with the present invention. This embodiment, however, is not intended as a limitation to the invention, rather, the present invention may be practiced in applications where no buffer sleeve 112 is used, as well as in systems where distance 118 approaches or equals zero.

As shown in FIG. 1, a vacuum system 120 is applied to exit surface 122 of plate 102 such that an airstream 124 (shown in dashed lines) is drawn into alignment hole 104 on face, or insertion side, 126 of the plate 102. Vacuum system 120 includes a vacuum chamber 128 that is in fluid communication with a vacuum hose 130 which draws the airstream 124 in direction 132 into vacuum source 134. It is to be appreciated that vacuum system 120 is merely exemplary to the present embodiment, and no limitation whatsoever is intended by the structure of the particular embodiment. Rather, the present invention includes all equivalents to system 120 which are capable of applying a partial vacuum to one or more alignment holes 104.

Application of the present invention is shown in FIG. 1 as fiber clamp 114 is advanced in direction 136 such that fiber 108 moves toward face 126 of plate 104. As fiber 108 approaches plate 104, the end 138 of fiber 108 becomes exposed to airstream 124 as it rushes into alignment hole 104. Due to the flexible nature of the fiber 108, as the fiber further approaches plate 102, the centering force resulting from airstream 124 brings the end 138 of fiber 108 into precise alignment with alignment hole 104. As the fiber 108 is further advanced toward plate 102, the end 138 of fiber 108 enters alignment hole 104 and is drawn towards exit surface 122 of plate 102.

The flexible nature of the fiber 108, in combination with the centering forces caused by the airstream 124 entering the alignment hole 104, allows for the rapid insertion of fiber 108 into alignment hole 104. The closer end 138 of fiber 108 comes to hole 104, the larger the centering forces resulting from airstream 124 as it rushes into the hole 104. Consequently, the insertion of fiber 108 into the alignment hole 104 in plate 102 may be done very quickly, and with very little attention to precision.

The present invention allows for the simultaneous insertion of multiple optical fibers 108 into plate 102. As a result, the ordinarily time-consuming installation of optical fibers 108 into a plate 102 is reduced to one quick and problem free action of advancing the fiber 108 toward the alignment hole 104. In fact, the high degree of precision ordinarily required in large scale manufacturing is virtually eliminated, allowing for a number of fibers 108 to be properly inserted into alignment holes 104 merely by positioning the fibers 108 adjacent the hole 104, and allowing the centering forces caused by the airstream 124 to draw the fiber 108 into proper alignment with and into alignment hole 104.

Only one alignment hole 104 has been shown with an airstream 124. However, it is to be appreciated that such an airstream 124 exists for each alignment hole 104 exposed to vacuum system 120, but these additional airstreams 124 have been omitted from FIG. 1 for clarity.

FIG. 1 also shows the position of a fiber 140 with buffer sleeve 142 once it has been drawn into alignment hole 144. In this instance, fiber 140 extends past plate 102 a distance 146. It is to be appreciated that the present invention provides for the insertion of fiber 140 into alignment hole 144 to any distance 146, with the end 148 extending past exit surface 122, positioned flush with exit surface 122, or recessed within alignment hole 144.

While the description of the present invention has included a plate 102 formed with alignment holes 104, it is to be appreciated that the present invention is useful for the insertion of an optical fiber 108 into any closely-sized receptacle. For example, the present invention may be used to insert optical fibers into a ferrule (not shown).

Figure 2:
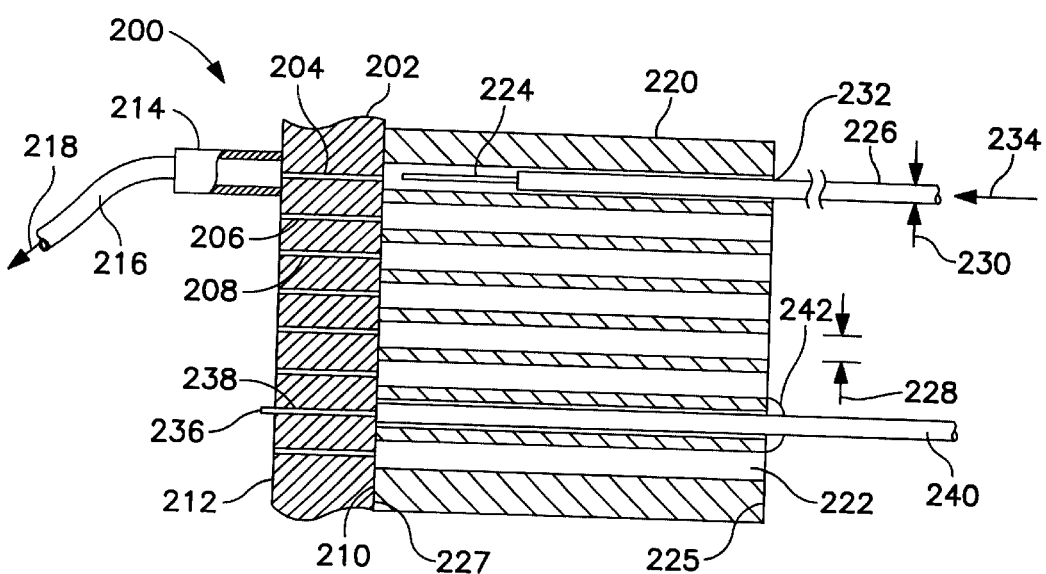
FIG. 2 is a cross-sectional view of an alternate embodiment of the present invention showing the optical fiber as the vacuum draws the fiber into alignment for insertion into a strain relief plate having blind holes.

Referring now to FIG. 2, a cross-sectional view of an alternate embodiment of the System for the Vacuum Assisted Insertion Of Optical Fibers of the present invention is shown and generally designated 200. Plate 202 is formed with a number of alignment holes 204, 206, 208 which extend from the face 210 of plate 202 to an exit surface 212. A vacuum chamber 214 provides a partial vacuum through tubing 216 as air is drawn in direction 218. As discussed above in conjunction with FIG. 1, the partial vacuum caused in chamber 214 creates an airstream (not shown this Figure) at the face 210 of alignment hole 204.

In the present embodiment, a strain relief plate 220 is provided which is formed with a number of bores 222 sized to receive a fiber 224 and buffer sleeve 226. It is to be appreciated that a buffer sleeve 226 is not required, however, and the present invention may be practiced with fibers 108 and 224 having no buffer sleeves 112 and 226. Each bore 222 in strain relief plate 220 extends from the entrance surface 225 to exit surface 227, and has a diameter 228 to receive buffer sleeve 226 having a diameter 230. The diameter 230 of a typical buffer sleeve 226 is 245 microns (245 $\mu$m) and the diameter 228 of a typical bore 222 is 0.635 millimeters. As a result, there is a sufficient opening 232 to allow sufficient air around buffer sleeve 226 and into bore 222 to create the airstream (not shown this Figure) for drawing fiber 224 into alignment hole 204. As fiber 224 is advanced in direction 234, the airstream (not shown this Figure) draws fiber 224 into alignment hole 204 as discussed above.

A strain relief plate 220 is particularly useful in circumstances where the movement of fiber 224 would corrupt the precise alignment of the fiber. Also, the larger strain relief plate 214 may be necessary because of the difficulty in drilling precise alignment holes 204 with very long aspect ratios. When a strain relief plate 220 is used in conjunction with plate 204, it is particularly difficult to insert fibers 224 into alignment holes 204 as these holes are considered "blind" since they are not visible during the insertion process.

Fiber 236 is shown fully inserted into alignment hole 238 in plate 202 with buffer sleeve 240 extending into bore 222 in strain relief plate 220. From this Figure it can be appreciated that a fiber 236 may be inserted into alignment hole 238 without the fiber 236 being equipped with a buffer sleeve 240. Rather, the airstream will be sufficiently powerful to draw the flexible fiber 236 into alignment hole 238 for proper positioning near exit surface 212. Once in position, the fiber 236 may be secured in place using a fiber clamp, such as clamp 114 shown in FIG. 1, or with an adhesive 242, such as epoxy.

METHOD OF THE INVENTION

Figure 3:
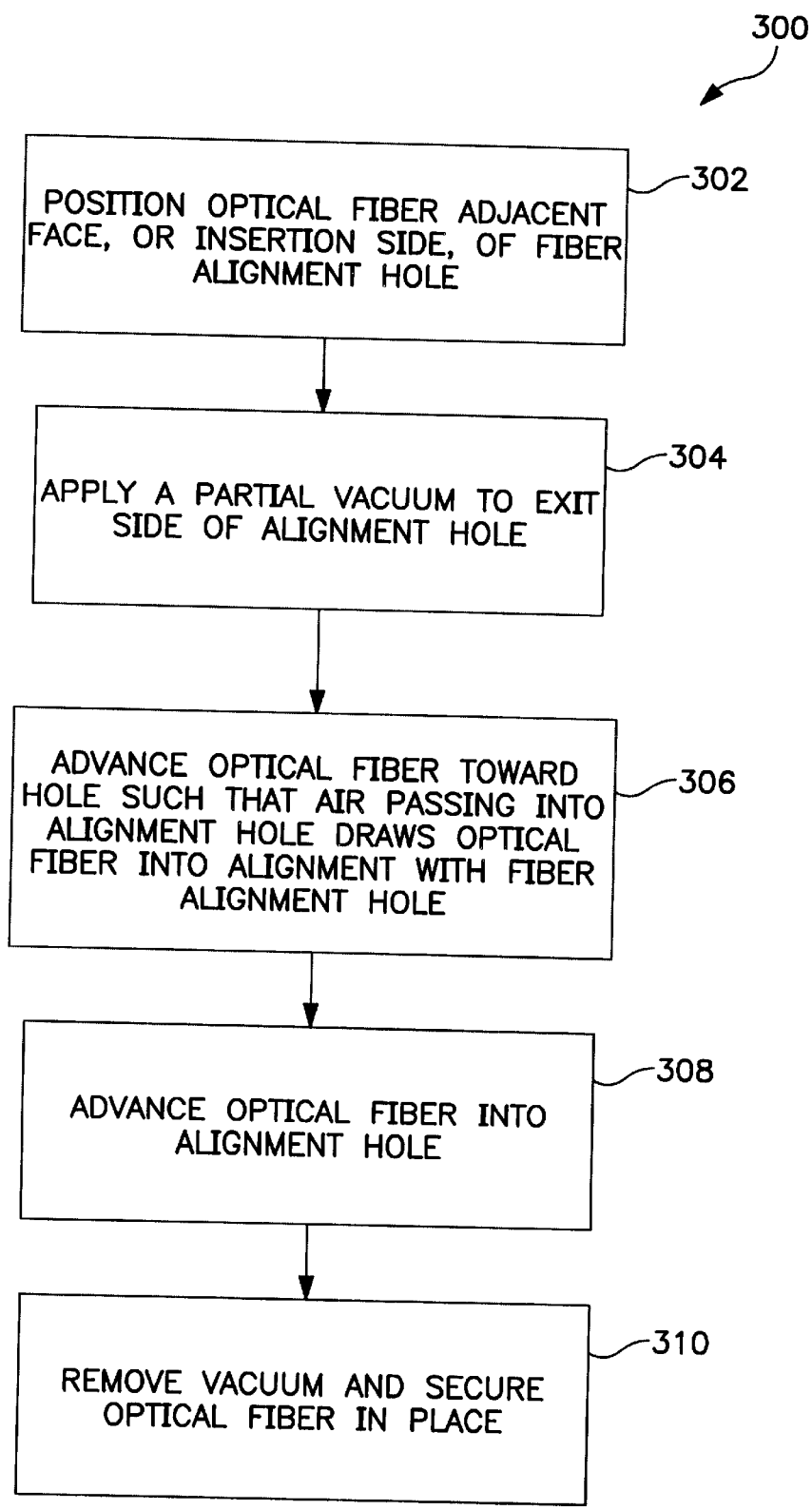
FIG. 3 is a flow chart for the method of operation for the System For The Vacuum Assisted Insertion of Optical Fibers of the present invention.

Referring now to FIG. 3, a flow chart of the Method For The Vacuum Assisted Insertion of Optical Fibers of present invention is shown and generally designated 300. Method 300 begins with first step 302 which includes the positioning of an optical fiber adjacent the face, or insertion side, of a fiber alignment hole. Once the optical fiber is positioned adjacent the face of an alignment hole, next step 304 includes the application of a partial vacuum to the exit side of the alignment hole creating an airstream to pass from the face of the alignment hole, through the alignment hole, and exiting from the exit side of the alignment hole.

Once the partial vacuum is applied to the alignment hole, the optical fiber is advanced toward the alignment hole in step 306. Because of the partial vacuum, the airstream provides a centering force to the fiber as it approaches the alignment hole, and this centering force draws the optical fiber into precise alignment with the alignment hole.

Once the fiber is aligned with the alignment hole in step 306, the optical fiber is advanced further towards and into the alignment hole in step 308. The optical fiber may be advanced through alignment hole to its desired position until the end of the fiber is flush with the exit side of the plate, extending through the plate a desired distance, or recessed within the plate.

Once the fiber is positioned as desired in the alignment hole in step 308, the vacuum source may be removed from the exit side of the plate in step 310, and the optical fiber is secured in place. The fiber may be secured in place using a clamp or an adhesive, as discussed more thoroughly above. Once positioned and secured, the optical Fiber can then be located with precision for further connection to an optical network.

The order of the steps discussed above and shown in FIG. 3 are merely exemplary of a preferred embodiment of the present invention. Thus, the particular order is not to be construed as a limitation on the scope of the invention, rather, the method steps may be performed in any order so long as the vacuum is applied to the exit side of the alignment hole and the fiber is drawn into the alignment hole. For example, the vacuum may be applied continuously during the insertion process, including before, during and after the insertion of the optical fiber into the fiber alignment hole. Also, the vacuum may be left in place against the exit side of the alignment hole while the fibers are secured in place, such as by clamping or by applying epoxy.

While the particular System and Method For The Vacuum Assisted Insertion of Optical Fibers as herein shown and disclosed in detail is fully capable of achieving the objects and providing the benefits herein before described, it is to be understood that it is merely illustrative of the presently preferred embodiments of the invention and that no limitations are intended to the details of construction or design, or the order of method steps, herein shown other than as described in the appended claims.

I claim:

1. A system for insertion of an optical fiber into an alignment hole, comprising:
   a plate formed with an alignment hole having an insertion side and an exit side;
   a partial vacuum source in fluid communication with said exit side of said alignment hole creating an airstream through said alignment hole from said insertion side to said exit side; and
   wherein said airstream provides a centering force and draws an optical fiber into said alignment hole.

2. The system of claim 1, wherein said alignment hole has a diameter, said optical fiber has a second diameter, and wherein said diameter is between one to twenty (1–20) microns larger than said second diameter.

3. The system of claim 2, wherein said optical fiber extends from a buffer sleeve having a third diameter, and wherein said third diameter is larger than said diameter of said alignment hole.

4. The system of claim 1, further comprising:
   a strain relief plate formed with a bore wherein said bore is positioned adjacent said alignment hole and wherein said airstream flows through said bore.

5. The system of claim 4, wherein said bore is in fluid communication with said alignment hole.

6. The system of claim 1, further comprising:
   a strain relief plate formed with a bore wherein said bore is positioned adjacent said alignment hole and wherein said airstream flows through said bore into said insertion side of said alignment hole.

7. The system of claim 1, wherein said alignment hole has a diameter, said optical fiber has a second diameter, and wherein said diameter is sized to closely receive said optical fiber.

8. A system for insertion of an optical fiber into an alignment hole, comprising:
   a plate formed with a plurality of alignment holes, each alignment hole having an insertion side and an exit side;
   a vacuum source in communication with said exit side of two or more said alignment holes creating an airstream through each said alignment hole from said insertion side to said exit side; and
   wherein said airstream provides a centering force and draws an optical fiber simultaneously into each of said two or more said alignment holes.

9. The system of claim 8, further comprising:
   a strain relief plate formed with a bore corresponding to and in fluid communication with each said alignment hole, and wherein said airstream flows through said bore and said alignment hole.

10. A method for inserting an optical fiber into an alignment hole having an insertion side and an exit side, comprising the steps of:
    applying a partial vacuum to the exit side of said alignment hole to create an airstream through said alignment hole from said insertion side to said exit side;
    positioning said optical fiber adjacent said alignment hole on said insertion side;
    advancing said optical fiber toward said alignment hole wherein said airstream draws said optical fiber into said alignment hole.

11. The method of claim 10, further comprising the step of advancing said optical fiber into said alignment hole a desired distance.

12. The method of claim 11, further comprising securing said optical fiber in place in said alignment hole.

13. The method of claim 10, further comprising the steps of:
    positioning a strain relief plate formed with a bore adjacent said alignment hole wherein said airstream passes through said bore; and
    advancing said optical fiber through said bore and into said alignment hole.

14. A method for inserting two or more optical fibers into a corresponding number of alignment holes, each alignment hole having an insertion side and an exit side, comprising the steps of:
    applying a partial vacuum to the exit side of each said alignment hole to create an airstream through each said alignment hole from said insertion side to said exit side;
    positioning each said optical fiber of said two or more optical fibers adjacent a corresponding alignment hole on said insertion side;
    advancing each optical fiber of said two or more optical fibers simultaneously toward said corresponding alignment hole wherein said airstream draws one said optical fiber into each said alignment hole.

15. The method of claim 14, further comprising the steps of:
    positioning a strain relief plate formed with a bore corresponding to each said alignment hole adjacent said alignment hole wherein said airstream passes through said bore and into said alignment hole; and
    inserting said optical fiber through said bore and into said alignment hole.

16. The method of claim 14, further comprising the steps of removing said vacuum source from said exit side of said alignment hole.

17. The method of claim 14, further comprising the steps of securing said optical fiber.

* * * * *